US008251423B1

(12) United States Patent
Lingle (10) Patent No.: US 8,251,423 B1
(45) Date of Patent: Aug. 28, 2012

(54) TRUCK BED HANDLE ASSEMBLY

(76) Inventor: James R. Lingle, Lindale, TX (US)

( * ) Notice: Subject to any disclaimer, the term of this patent is extended or adjusted under 35 U.S.C. 154(b) by 307 days.

(21) Appl. No.: 12/636,838

(22) Filed: Dec. 14, 2009

Related U.S. Application Data

(60) Provisional application No. 61/122,111, filed on Dec. 12, 2008.

(51) Int. Cl.
*B60J 9/00* (2006.01)
(52) U.S. Cl. ...................................................... 296/1.02
(58) Field of Classification Search .................. 296/1.02, 296/57.1, 37.6, 62, 3; 224/403, 404; 280/47.27, 280/47.28, 47.371, 655, 655.1
See application file for complete search history.

(56) References Cited

U.S. PATENT DOCUMENTS

| | | | | |
|---|---|---|---|---|
| 3,841,690 A * | 10/1974 | Piercy | .............................. | 296/10 |
| 3,971,426 A * | 7/1976 | West et al. | .................... | 157/1.28 |
| 4,419,038 A * | 12/1983 | Pendergraft | .................. | 414/543 |
| 4,768,824 A * | 9/1988 | Andonian | ..................... | 296/165 |
| 4,949,945 A * | 8/1990 | Whiteley | ........................ | 269/71 |
| 4,964,768 A * | 10/1990 | Shomo | ........................... | 410/94 |
| 5,110,021 A * | 5/1992 | Dawson, Jr. | .................. | 224/405 |
| 5,364,154 A * | 11/1994 | Kaiser | ...................... | 296/100.07 |
| 5,560,666 A * | 10/1996 | Vieira et al. | ...................... | 296/3 |
| 5,704,681 A * | 1/1998 | Lambden | ................. | 296/100.06 |
| 5,743,702 A * | 4/1998 | Gunderson | .................. | 414/542 |
| 5,984,353 A * | 11/1999 | Rasmussen | ................ | 280/766.1 |
| 6,070,313 A * | 6/2000 | O'Brian | .......................... | 29/240 |
| 6,202,664 B1 * | 3/2001 | Shenton et al. | ............ | 135/88.03 |
| 6,227,592 B1 * | 5/2001 | Thacker | ...................... | 296/26.07 |
| 6,332,637 B1 * | 12/2001 | Chambers | ........................ | 296/3 |
| 6,347,731 B1 * | 2/2002 | Burger | .......................... | 224/405 |
| 6,666,490 B1 * | 12/2003 | Thacker | ...................... | 296/26.07 |
| 6,877,764 B2 * | 4/2005 | Sagol | ......................... | 280/655.1 |
| 7,536,820 B2 * | 5/2009 | Wade et al. | ........................ | 42/94 |
| 7,722,110 B2 * | 5/2010 | McCarthy et al. | ............ | 296/156 |
| 2008/0083352 A1 * | 4/2008 | Tovani | ............................ | 108/44 |
| 2009/0026784 A1 * | 1/2009 | Green | .............................. | 296/3 |
| 2009/0295182 A1 * | 12/2009 | Segeren et al. | ............. | 296/26.11 |
| 2011/0204592 A1 * | 8/2011 | Johansen et al. | ........... | 280/304.1 |
| 2011/0268542 A1 * | 11/2011 | Wahls | ........................... | 414/408 |

* cited by examiner

*Primary Examiner* — Kiran B Patel
(74) *Attorney, Agent, or Firm* — Grady K. Bergen (57) ABSTRACT

A truck bed handle assembly is formed from a handle formed from an elongated handle body having an upper end and lower end. The truck bed handle assembly further includes a handle receiver assembly that is configured for mounting to a sidewall of a truck bed. The handle receiver assembly has a handle receiving portion that engages the lower end of the elongate handle body to hold the handle body in a generally upright orientation. The handle may be a collapsible or non-collapsible handle.

16 Claims, 7 Drawing Sheets

TRUCK BED HANDLE ASSEMBLY

CROSS-REFERENCE TO RELATED APPLICATIONS

This application claims the benefit of U.S. Provisional Application No. 61/122,111, filed Dec. 12, 2008, which is incorporated herein by reference in its entirety.

BACKGROUND

The invention is directed toward a device that stabilizes or assists individuals while positioned on a truck bed or during entering or exiting the truck bed.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
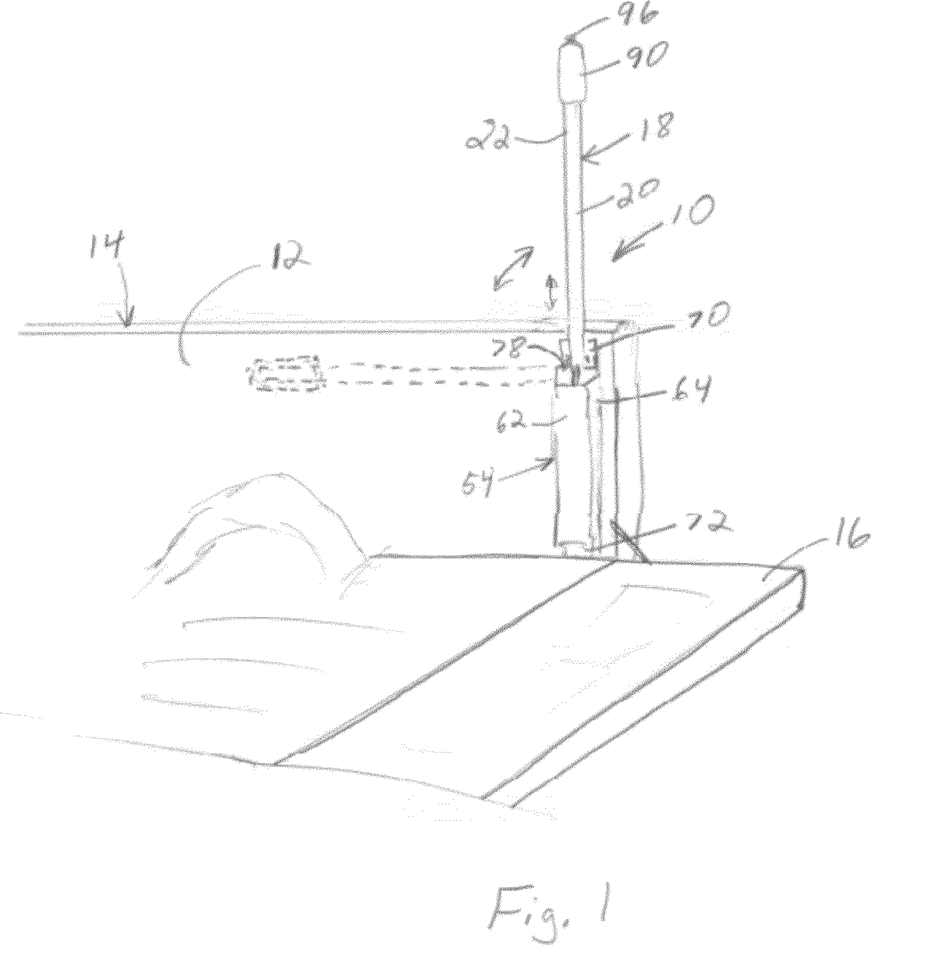
FIG. 1 is a perspective view of the rear portion of a truck bed of a pickup truck, showing a truck bed handle assembly mounted to sidewall of the truck bed in accordance with the invention.

Referring to FIG. 1, truck bed handle assembly 10 is shown mounted to a sidewall 12 of a truck bed 14 of a conventional pickup truck. The handle assembly 10 is mounted to the rear of the truck bed near the tailgate 16, which is shown in a lowered position for accessing the truck bed 14. Although the handle assembly 10 is shown mounted to the rear of the truck bed 14, it may be mounted at other positions along the truck bed as well and on either sidewall. In certain applications, more than one handle assembly 10 may be mounted to the truck bed at various positions.

Figures 2, 3, 4, 5:
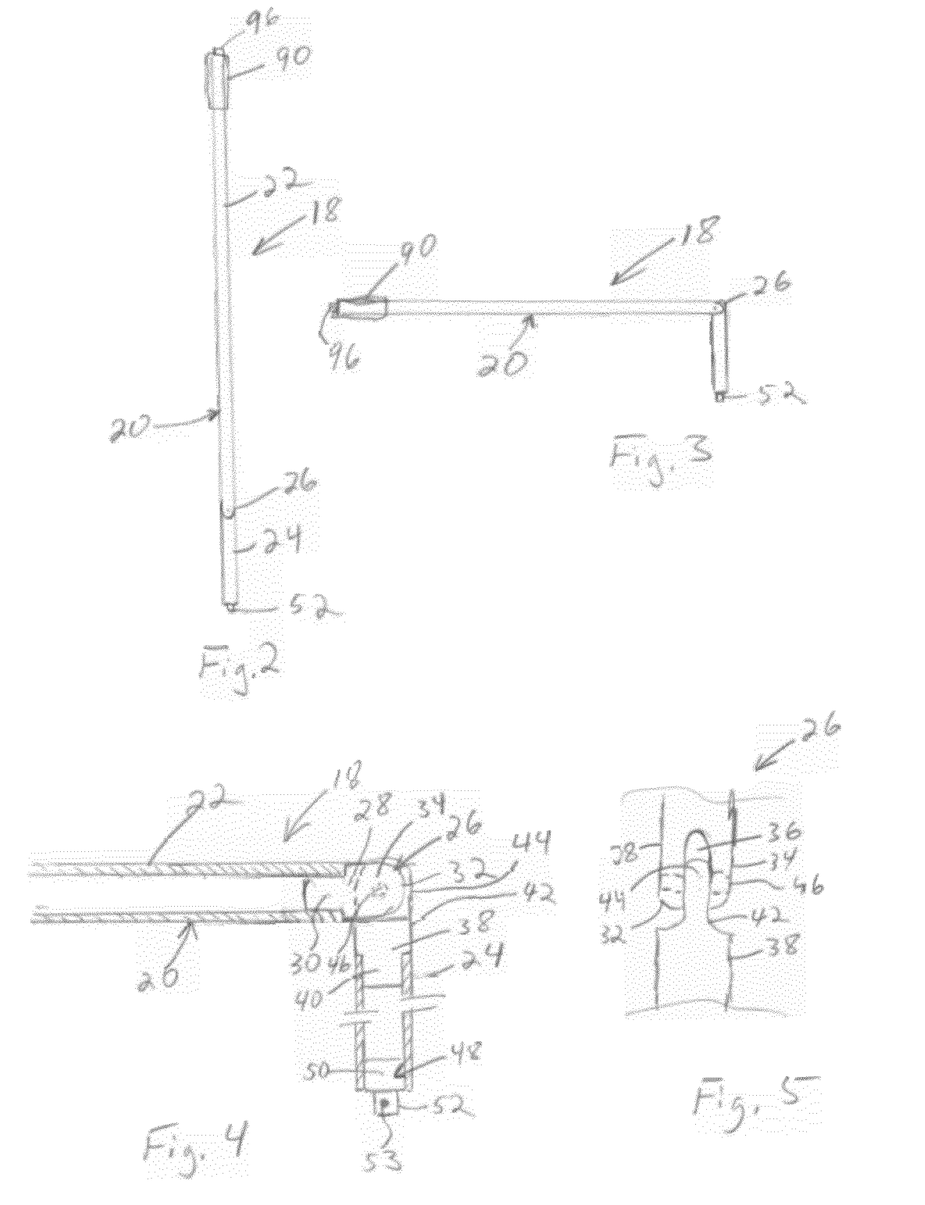
FIG. 2 is a side elevational view of a handle of the truck bed handle assembly of FIG. 1, with the handle in an extended configuration.
FIG. 3 is a side elevational view of the handle of FIG. 2 shown in a collapsed configuration.
FIG. 4 is a cross-sectional side view of a lower portion of the handle of FIG. 3 in a collapsed configuration.
FIG. 5 is a front view of a hinged joint of the handle of FIG. 2 that joins upper and lower sections of the handle together and shown in an extended configuration.

Referring to FIG. 2, a handle 18 of the handle assembly 10 is shown in an extended configuration. The handle 18 is shown as a collapsible handle and includes a handle body 20 that is formed as an upper section 22 and lower section 24 that are joined together at hinged joint 26 to allow the two sections 22, 24 to pivot relative to one another. Although the handle body 20 is shown and described herein as being a collapsible handle body formed into two sections, the handle body may be formed from a single length of material or may otherwise be formed as a single rigid body that is non-collapsible. In such embodiments, the rigid handle body may not collapse as does the handle body 20, as is described in more detail below. The present invention is meant to encompass truck bed handle assemblies that include both collapsible and non-collapsible handle bodies. In certain embodiments, a collapsible handle may be formed from telescoping sections (not shown) that may be configured as tubular sections wherein one section is received within another and that can be moved longitudinally to extended and collapsed configurations.

FIG. 3 shows the handle body 20 of the handle 18 in a collapsed configuration. The handle 18 in this collapsed configuration is shown in outline in FIG. 1 and shows how the handle 18 can be moved between extended and collapsed configurations during use and storage. As shown in FIG. 1, when in the collapsed configuration, the handle 18 may be located at a position adjacent to the sidewall 12 and below the upper edge of the sidewall 12 of the truck bed so that it is out of the way.

The handle body 20 may be formed from metal tubing. In certain embodiments, the tubing of the handle body 20, as well as other components of the assembly 10, may be formed from stainless steel, steel, mild steel, iron, high-strength aluminum or other suitable material having sufficient structural strength and rigidity to function for its intended purpose, as is described herein. The metal materials may be coated or surface treated to prevent corrosion or provide a desired appearance, such as galvanized, chrome-plated or painted materials. The handle body 20 and other components of the assembly 10 may also be formed from non-metal materials, such as wood or composite materials, such as fiberglass or graphite composites, etc. Although the handle body 20 is shown as being formed from as a tubular body having a generally circular cross section, it may be formed as a non-tubular body and may be entirely solid or have non-solid portions and have a non-circular cross sections. In certain embodiments, the handle body 20, as well as other components of the assembly 10, may be formed from 304 stainless steel alloy materials. An example of a suitable tubular material for the handle body 20 is one-inch outer diameter 304 stainless steel alloy tubular material having a wall thickness of from about a 5 to about 16 gauge, more particularly from about 10 to about 12 gauge. The handle may have a total length of from about 20 to 48 inches, more particularly from about 24 to 36 inches.

It should be understood that with respect to any amount range listed or described herein as being useful, suitable, or the like, it is intended to include every amount or number within the range, including the end points, and is to be considered as having been specifically stated. For example, "a range of from 1 to 10" is to be read as indicating each and every possible number along the continuum between about 1 and about 10. Thus, even if specific points within the range, or even no points within the range, are explicitly identified or refer to only a specific few, it is to be understood that the inventor appreciates and understands that any and all points within the range are to be considered to have been specified, and that the inventor is in possession of the entire range and all points within the range.

Referring to FIG. 4, an enlarged cross-sectional view of the hinged joint 26 joining the two sections 22 and 24 of the handle body 20 is shown. The lower end of the upper section 22 is provided with an end piece 28 that is coupled to the upper section 22 of the handle body 20. In the embodiment shown, the end piece 28 is configured to have a generally cylindrical inner plug portion or insert 30 that is sized to be closely received within the lower end of the tubular section 22. The outer end 32 of the end piece 28 may have an annular shoulder that abuts against the end of the upper section 22 and effectively closes the lower end of the upper section 22. The outer end 32 of the end piece 28 opposite the plug portion 30 is provided with a pair of hinge arms 34 (FIG. 5) that are spaced apart to form a slot or groove 36.

Similarly, the upper end of the lower section 24 of the handle body 20 is provided with an end piece 38 having an inner plug portion or insert 40 that is configured to be closely received within the upper end of the tubular section 24. The outer end 42 of the end piece 38 may be provided with an annular shoulder that abuts against the end of the lower section 24 and effectively closes the upper end of the upper section 24. The outer end 42 of the end piece 38 opposite the plug 40 tapers or narrows to provide a central projection or arm 44 (FIG. 5) that is configured to be received within the slot 36 formed by the arms 34.

A transverse hinge pin or rod 46 is passed through the arms 34 and 44 couples the end pieces 28, 38 together to form the joint 26. The pin 46 may be oriented at right angle relative to the longitudinal axes of the sections 22, 24. As can be seen from FIGS. 4 and 5, the ends of the end pieces 28, 38 may be curved or rounded at their ends and be provided with sufficient clearances so that the upper and lower sections 22, 24 may be freely rotated or pivoted relative to one another about the axis of the pin 46. The joint 26 may allow the upper and lower sections be pivoted so that the longitudinal axes of the sections 22, 24 can be pivoted from 0° to 90° or more relative to one another in either direction. It should be noted that the joint 26 shown and described is merely one example of a suitable joint. Other joints or hinges may also be used, including a universal joint that allows pivoting of the two sections about more than one axis. As an example, this may be accomplished by making one or both of the end pieces 28, 38 rotatable about a longitudinal axis of the upper and lower sections 22, 24, as well as the axis of the pin 46.

The end pieces 28, 38 may each be formed from a single piece of machined steel or other material that is coupled to the tubular material of the sections 22, 24, such as through welding. The exterior may be ground and smoothed so that no gaps or spaces are visible and a smooth continuous appearance is provided to each of the components.

The lower end of the lower section 24 may be provided with a fitting 48. The fitting 48 may include a tool or tool component or a device for receiving a tool or tool component. In the embodiment shown, the fitting 48 includes a plug portion or insert 50 that is closely received in the interior of the lower end of the lower section 24. A drive fitting 52, which may be square or polygonal-shaped fitting, projects from plug portion 50 and the end of the lower end of the lower section 24. The fitting 52 may be in the form of a conventional ⅜", ½" or ¾" square drive fitting that are commonly used with sockets of socket wrenches and other tools or tool components, and may include a biased ball detent 53. Other drives or devices may be provided at the lower end of lower section 24, as well. The fitting 48 may be welded or non-releasably and non-movably coupled to the lower section 24. In other embodiments, the fitting 48 may be releasably and/or movably coupled to the lower section 24.

Figure 6:
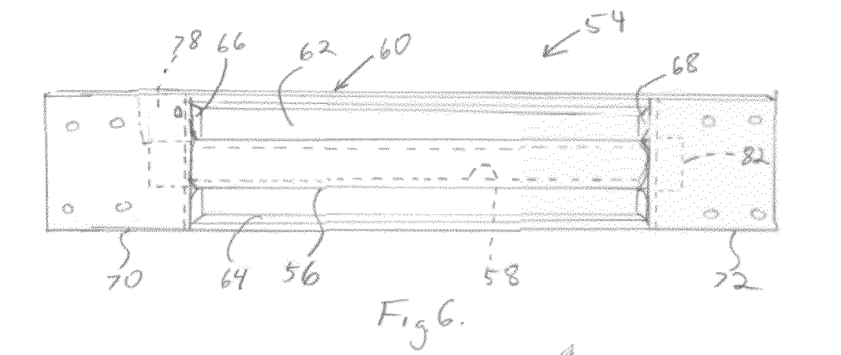
FIG. 6 is a rear view of a handle receiver assembly of the truck bed handle assembly of FIG. 1.

Referring to FIG. 1, the handle 18 is mounted to the truck bed sidewall 12 through a handle receiver assembly 54. In FIG. 6, a rear view of the handle receiver assembly 54 is shown. The handle receiver assembly 54 includes a receiver portion 56 configured for receiving the handle 18. The receiver portion 56 may be an elongated sleeve or tubular member having a central opening 58 that is configured to closely receive the tubular handle body 20. As an example, the receiver tube 56 may be 1¼ inch OD steel tube having an inner diameter of 1 inch. This will facilitate accommodating a handle body 20 formed from approximately 1 inch OD steel tubing. In certain embodiments, the receiver tube 56 may be formed from 304 stainless steel alloy materials or other suitable materials having a wall thickness of from about 5 to about 16 gauge, more particularly from about 10 to about 12 gauge.

In the embodiment shown, the receiver tube 56 is coupled to a receiver bracket of the handle receiver assembly 54 for supporting the tube 56. In the embodiment shown, the receiver bracket is in the form of a casing or housing 60 that is configured as a hollow box-like structure having a front wall 62 that is joined along the edges by opposite longitudinal sidewalls 64. Examples of suitable dimensions for the width of the front wall may be from about 2 to 3 inches, with the width of the sidewalls being from about 1½ to 3 inches. The back of the receiver casing 60 is open, as shown in FIG. 6. This may facilitate welding of the receiver tube 56 to the casing 60 during manufacture. In an alternate embodiment, the back of the receiver casing 60 may be provided with a wall or enclosure to enclose the receiver casing. End walls 66, 68 are provided at the upper and lower ends of the receiver casing 60, respectively. In other embodiments, the casing or housing 60 may be entirely or partially solid, with the receiver tube 56 being encased or enclosed within the solid material. The walls of the receiver housing 60 may be made of steel, such as 304 stainless steel, or other suitable material that provides sufficient structural strength and durability to function in the manner as described herein. In certain embodiments, where a solid material is used for the housing 60, it may be a non-metal material, such as plastic, fiberglass, etc. that may be molded, formed or otherwise configured around the receiver tube 56. In still other embodiments, a separate receiver tube or element may not be provided, but the receiver casing may be constructed or molded as one or more pieces wherein an opening(s) or passage is formed in the casing that functions as the receiver portion or tube.

The handle receiver assembly 54 may also include mounting flanges or structures configured for engaging and coupling the assembly 54 to the truck bed, such as the sidewall 12. In the embodiment shown, the mounting flanges 70, 72 extend from the upper and lower ends of the casing 60, respectively. The mounting flanges 70, 72 may generally lie in a plane that is substantially parallel with the back of the receiver casing 60, with the rearward surface of the mounting flanges 70, 72 being generally flush with the rearward surface of the receiver casing 60. In other embodiments, the flanges 70, 72 or other mounting structures may project from or be recessed from the casing 60 to facilitate engagement with the truck bed 14 or truck bed sidewall 12. The mounting flanges or structures may be configured in a manner to cooperate and engage various structures of the truck bed, which may constitute flat or non-flat surfaces or structures to facilitate mounting of the handle receiver assembly 54 to the truck bed. Mounting holes 74 may be provided in the mounting flanges for receiving fasteners used to secure the assembly 54 to the truck bed. In the embodiment shown, there are four mounting holes arranged in a rectangular configuration in the flanges 70, 72. Other configurations for the mounting holes may also be used.

In the embodiment shown, the walls and materials of the casing 60 and flanges may be metal sheet material, such as 304 stainless steel plate. An example of a suitable gauge steel is that of from about 5 to about 20 gauge sheet metal, more particularly form about 10 to 16 gauge sheet metal. The walls of the casing 60 and flanges 70, 72 may be formed from one or more pieces of sheet material that are stamped or cut and bent to shape, with the walls being welded together or otherwise secured together to provide the desired configuration for the casing 60 and flanges 70, 72. The surfaces and edges of the casing and flanges may be machined and smoothed if necessary.

The casing 60 may have a length sufficient for holding the tubular receiver 56. In the embodiment shown, the receiver tube 56 is received within circular openings formed in the end walls 66, 68 and is coupled and secured within the openings through welding or other coupling means or fasteners. The ends of the receiver tube 56 may be flush with the end walls 66, 68 or project a distance from the end walls 66, 68, as in the embodiment shown.

The receiver tube 56 has a length sufficient to receive and hold the handle 18 in an upright manner and the receiver assembly 54 is provided with sufficient structural strength to retain the handle 18 in the upright position during use, as described herein. An example of a suitable length for the receiver tube 56 is from about 8 inches to about 14 inches. In one embodiment, the length of the receiver tube is from about 10 to 12 inches. The length of the casing 60 may be similar to that of the receiver 56. In the embodiment shown, the ends of the receiver tube 56 are shown projecting from the end walls 66, 68 a distance. One or both ends may extend from the end walls 66, 68. One or both ends of the receiver tube 56 may project from about ¼ inch to about 2 inches or from about ½ to about 1 inch from either end wall 66, 68.

In the embodiment shown, the upper end of the receiver tube 56 that extends from the end wall 66 of the casing 60 is provided with a cutout or slot 76 that extends downward from the upper end of the tube 56 along one side of the tube 56. The cutout 76 may be a concave arcuate recess and be configured to closely receive the upper section 22 of the handle body 20 when it is in the collapsed configuration.

Figure 7:
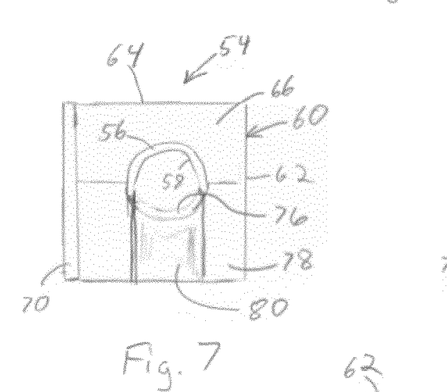
FIG. 7 is top plan view of the handle receiver assembly of FIG. 6.
Figure 8:
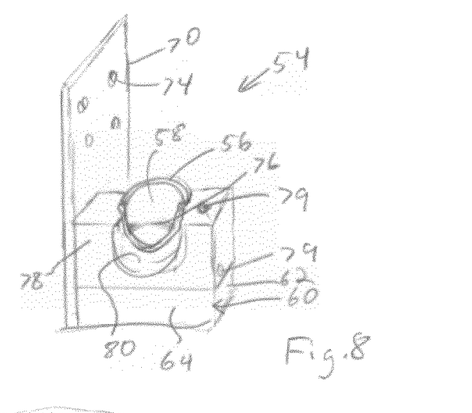
FIG. 8 is a top perspective view of the upper portion of the handle receiver assembly of FIG. 6.

As shown in FIGS. 7 and 8, a handle rest 78 is provided with the receiver assembly 54. The rest 78 may be formed from a rectangular block or body of rigid plastic (e.g ABS plastic), rubber or other suitable material and is provided with a concave channel or slot 80 that communicates with the cutout 76. The sides of the rest 78 may be configured to abut the end wall 66 and outer surface of the mounting flange 70, as shown. The rest 78 may be mounted to the mounting flange 70 and/or receiver casing 60 by fasteners 79 (e.g. screws or bolts), welding, gluing or other suitable coupling means. The upper surface of the rest 78 may substantially level with the upper end of the receiver tube 56, as shown. Other configurations for the rest 78 may be provided as well.

Figure 9:
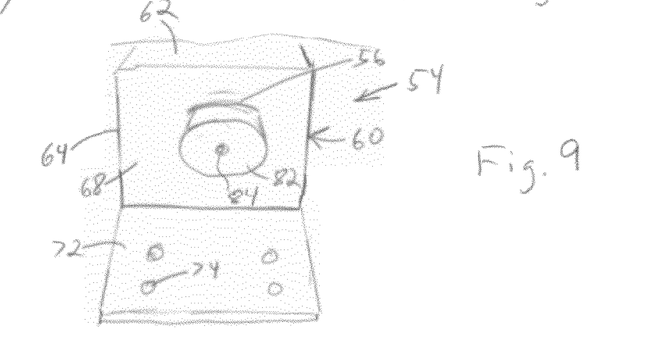
FIG. 9 is a bottom perspective view of the lower portion of the handle receiver assembly of FIG. 6.

Referring to FIG. 9, the lower end of the receiver tube 56 is provided with a stop member 82 that engages the lower end of the handle 20 to prevent the handle from passing through the receiver tube 56 when positioned therein. In the embodiment shown, the stop member 82 is configured as an end cap that substantially covers the lower opening of the tube 56. The end cap 82 may be welded or otherwise coupled (threaded, etc.) to the tube 56 by suitable coupling means. A small hole 84 or opening may be provided to allow drainage from the tube 56, if necessary. The stop member 82 may have other configurations as well.

Figure 10:
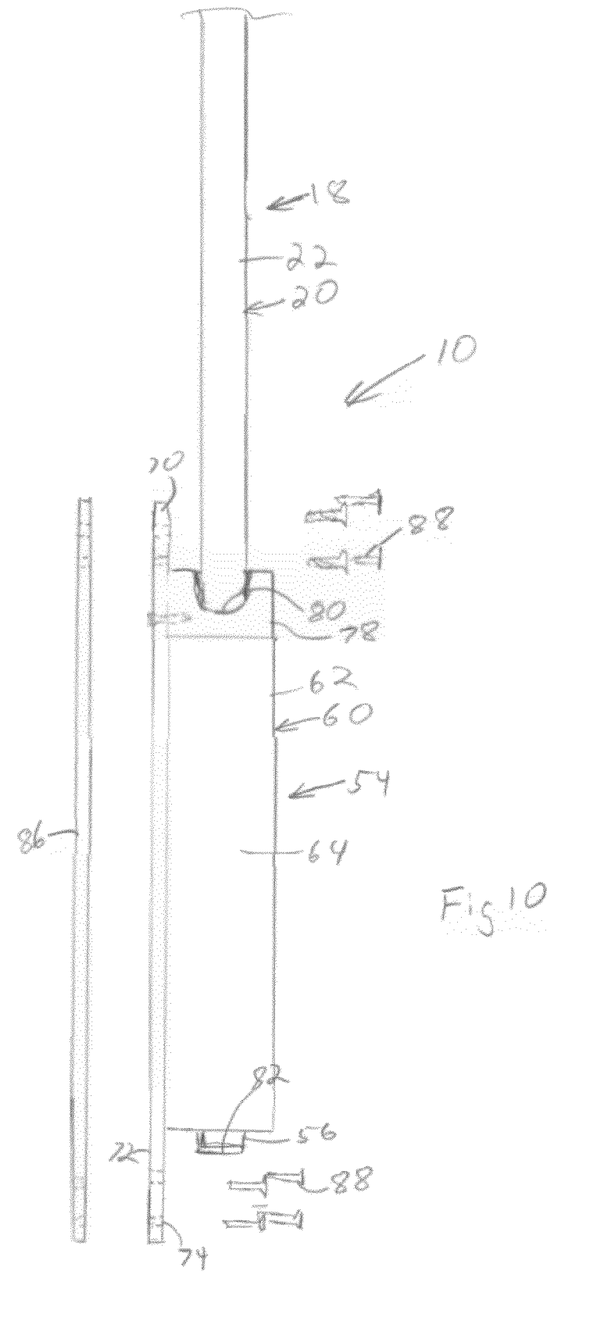
FIG. 10 is a side elevational view of the truck bed handle assembly of FIG. 1.

Referring to FIG. 10, a backing plate 88 may be provided with the receiver assembly 54. The backing plate 88 may be formed from a layer or layers of plastic (e.g. ABS plastic) or rubber material that interfaces with the rearward surfaces of mounting flanges 70, 72 and the body or sidewall 12 of the truck bed 14. In the embodiment shown, the backing plate 88 is a single layer of material that generally overlays the entire footprint of the receiver assembly 14 formed by the mounting flanges 70, 72 and the casing 60, and effectively closes off the opening on the rearward side of the casing 60. The backing plate 88 may be provided with mounting holes 90 that correspond and align with the mounting holes 74 for receiving fasteners 88, which may be in the form of metal screws, for coupling the assembly 54 to the truck bed 14.

Figure 11:
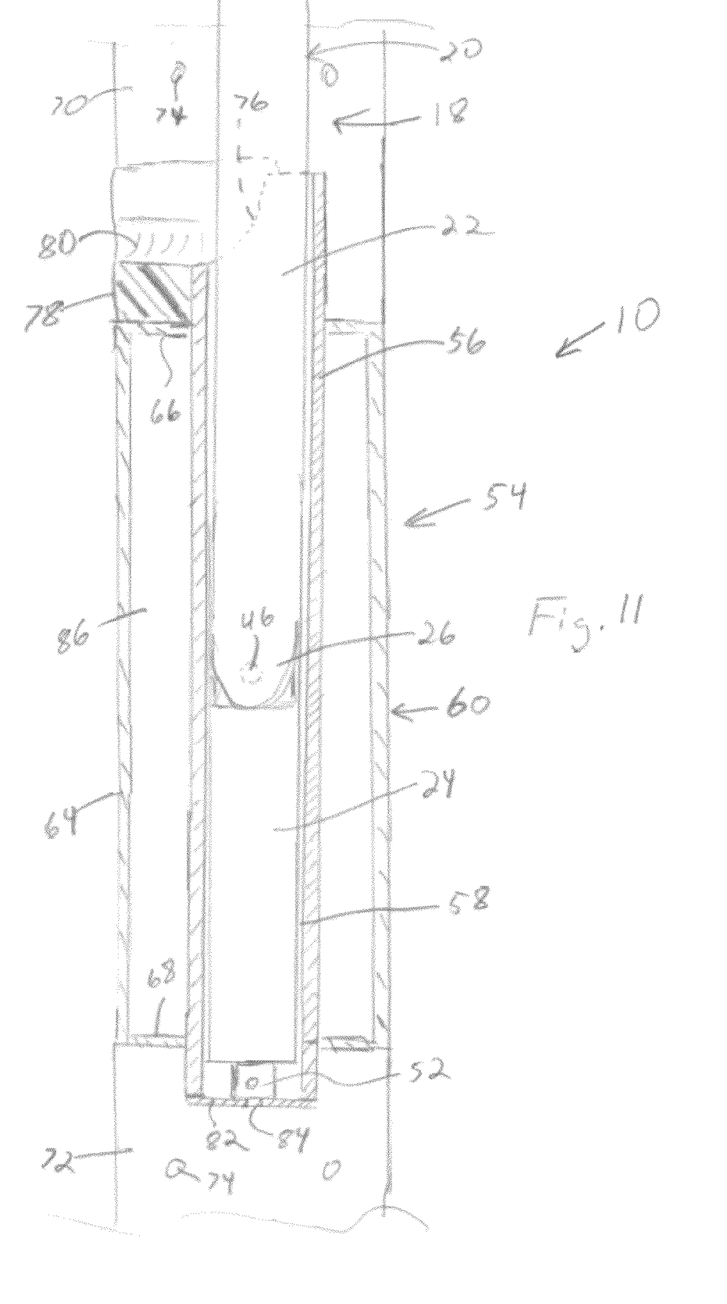
FIG. 11 is a partially sectioned front elevational view of the truck bed handle assembly of FIG. 6, showing the handle in the extended configuration.

FIG. 11 shows a detailed view of the truck bed handle 18 releasably engaged with and held in the upright configuration by the handle receiver assembly 54. As shown, when the handle 18 is in the upright position, with both the upper and lower sections 22, 24 of the handle body 20 aligned, the lower end of the handle body may be fully inserted and received in the opening 58 of the receiver tube 56. The receiver tube 56 has a sufficient length such that it receives the entire lower section 24, the joint 26 and a portion of the lower end of the upper section 22 so that both sections 22, 24 are generally aligned and held upright within the receiver tube 56. When the handle 18 is fully inserted, the receiver tube 56 may extend above the joint 26 a distance (e.g. 3 to 5 inches). This facilitates holding the entire handle 18 in an upright position so that the upper section 22 cannot pivot about the transverse axis or pin 46 of the joint 26. It should be noted that in embodiments where the handle 18 may be formed from a continuous length without the joint 26, the receiver tube 56 may have a shorter length to facilitate holding the handle 18 upright.

When fully inserted and engaged within the receiver tube 56, the lower end of the handle 18 will abut and rest against the stop 82. In the embodiment shown, the fitting 42 is shown resting against the stop 82. In certain embodiments, the fitting 42 or other components of the handle 18 may selectively engage the receiver assembly 54 to prevent rotation of the handle 18 within the tube 56 or may be further selectively locked into place to prevent removal from the receiver 56. In other embodiments, the handle 18 may non-releasably or permanently engage the receiver assembly so that it cannot be removed from the receiver assembly 54. When the receiver assembly 54 is mounted to a truck bed and the handle body 20 is fully engaged and received by the receiver assembly, the handle body may extend from about 10 to about 40 inches above the truck bed sidewall 12 when in the upright configuration in certain embodiments.

Figure 12:
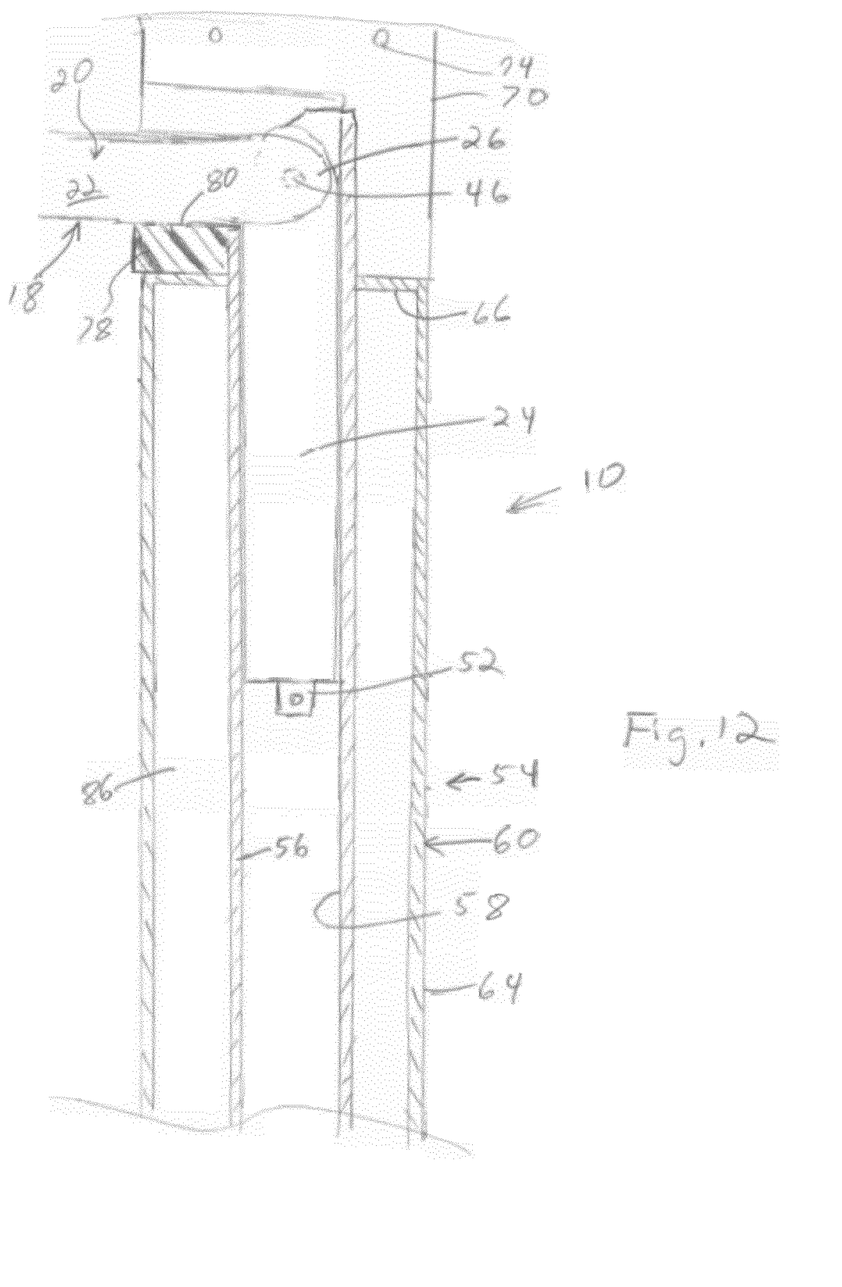
FIG. 12 is a partially sectioned front elevational view of the truck bed handle assembly of FIG. 11, showing the handle in the collapsed configuration.

Referring to FIG. 12, the handle 18 is shown in the collapsed configuration. When in the collapsed configuration, the handle 18 may be raised from the assembly 54 a distance so that the joint 26 clears the cutout 76 or upper end of the receiver tube 56 to allow the upper section 22 to be pivoted about the pin 46 of the joint 26. The entire lower section 24 or a substantial portion of the length of the section 24 will remain positioned within the receiver tube 56 so that the lower end of the handle 18 remains in place within the receiver tube 56 when the handle 18 is subjected to lateral forces.

As shown in FIG. 12, when the upper section 22 is pivoted, the upper section 22 engages the cutout 76 and channel 80 of the rest 78 so that further pivotal movement is prevented. The cutout 76 and channel 80 may also prevent rotation of the upper section 22 about the longitudinal axis of the lower section 24 and receiver tube 56. This facilitates keeping the upper section 22 at a selected position along the sidewall 12 of the truck bed 14 or other area. The cutout 76 and/or channel 80 may be oriented in any position relative to the receiver tube 56 so that the upper section 22 of the handle 18 may be oriented in any selected position. More than one cutout or channel may also be provided so that the upper section 22 of the handle may be oriented in multiple positions.

Figure 13:
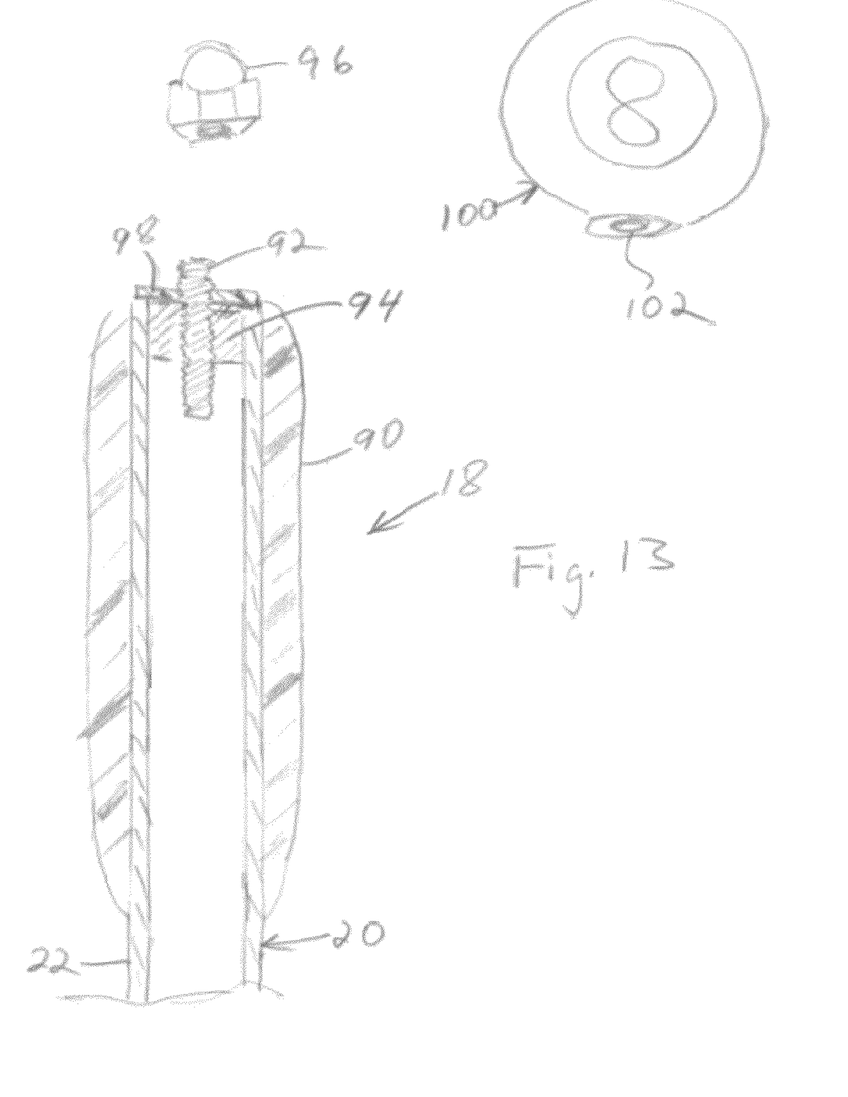
FIG. 13 is a cross-sectional elevational view of the upper end of the handle of FIG. 2 showing a grip of the handle and a threaded coupling with attachments for coupling to the threaded coupling member exploded away from the threaded coupling.

FIG. 13 shows the upper end of the upper section 22 of the handle body 20. The upper end of the upper section 22 may be provided with a hand grip 90. The hand grip 90 may be configured as a plastic or rubber sleeve that fits over the exterior of the tubular material forming the upper section 22. The hand grip 90 may be contoured or configured to provide a comfortable and secure grip. The hand grip 90 may be provided with finger cutouts or recesses for receiving one or more fingers. The surface of the hand grip 90 may also be texturized to provide a non-slip surface to facilitate a secure grip.

In the embodiment shown, a helically threaded coupling 92 is provided at the upper end of the upper section 22. To facilitate mounting of the coupling 92, a plug or insert 94, which may be formed of metal or other suitable material, may be inserted into and closely received within the upper end of the tubular section 22 and secured in place, such as by welding, gluing or other fastening means. The plug 94 facilitates securing the threaded coupling 92 so that it projects a distance from the upper end of the upper section 22 of the handle body 20. The plug 94 may be provided with a central opening that is internally threaded for engaging external threads of the coupling 92, which may be formed from a length of all thread (e.g. ⅜ inch×2 inch all thread).

A threaded end cap 96 may be provided to secure over the projecting end of the threaded coupling 92. The end cap 96 may be in the form of an acorn nut, which may be stainless steel or chrome plated steel, with nut flats for engagement with a wrench for tightening or loosening of the cap 96 on the coupling 92. A washer 98, which may be a metal, plastic (e.g. nylon) or other material, may be positioned over the end of the threaded coupling 92 between the end cap 96 and plug insert 94.

The end cap 96 may be interchanged or replaced with various attachments, such as the eight-ball decorative attachment 100, shown in FIG. 13. The attachment 100 is provided with a threaded opening 102 for engaging and coupling to the coupling 92. Other optional attachments may also be provided that attach to the coupling 92. These may include useful or decorative articles. Examples may include D-rings, hooks, tools, etc., or ornamental objects of various shapes and sizes.

In use, the assembly 10 may initially be provided as part of a kit that is used to install the assembly 10 on a preexisting truck bed. The kit may be provided with instructions and tools to facilitate installation of the assembly. Holes for receiving the fasteners or mounting screws 88 may be drilled in the sidewall of the truck bed. A template may be provided with the kit so that the holes are drilled to align with the mounting holes of 74 of the mounting flanges. The receiver assembly 54 is then mounted to the sidewall 12 or other area of the truck or truck bed 14. In some embodiments, the receiver assembly 54 and/or handle assembly 10 may be preinstalled on the truck as part of the truck's original equipment.

With the receiver assembly 54 mounted on the truck, the handle 18 is fully inserted into the receiver tube 56 so that it is maintained in a fully upright position, as shown in solid line in FIG. 1 and in FIG. 11. When in this position, the handle 18 may be grasped by a user to facilitate entering and exiting the truck bed and/or to facilitate stabilizing the user while being positioned on or in the truck bed.

When no longer needed, the handle 18 may be removed from the receiver assembly 54 and stored in a convenient location for reuse. Removal of the handle hand between usages may be desirable in embodiments where the handle is non-collapsible. In certain embodiments, the handle 18 may be permanently engaged with the receiver assembly 54 so that it cannot be removed. If it is non-collapsible it may remain in the upright position.

In embodiments that employ a collapsible handle, the handle 18 may moved to the collapsed position when not in use and moved to the extended position when needed. In the embodiment shown, the handle 18 is moved to the collapsed position by lifting the handle slightly so that the joint 26 is raised and the upper section 22 of the handle 18 can be pivoted to a collapsed position, as shown in the dotted line in FIG. 1 and in FIG. 12. When in the collapsed position, the handle 18 may be located at a position immediately adjacent to the sidewall 12 of the truck bed 14 so that is unobtrusive and out of the way. The upper section 22 may rest in the channel 80 of the handle rest 78 so that it remains in this position. Optional locking mechanisms (not shown) may be used to lock the handle in the collapsed position in certain embodiments.

The handle 18 may then be raised to the upright and extended position by lifting the upper section 22 from the rest 78 so that it is generally aligned with the lower section 24 and can be lowered into the receiver tube 56, so that the handle 18 is securely held in the upright position by the receiver assembly 54. In certain instances, it may be desirable to fully remove the collapsible handle 18 from the receiver assembly 54 and store it in a convenient location away from the receiver assembly 54 when it is not in use.

In certain applications, the handle 18 may be used as a handle of tool. The length of the handle 18 may provide a high degree of torque than would not otherwise be provided by many handheld tools. By fully removing the handle 18, the fitting 52 may be coupled to a socket or other tool or tool component. The handle 18 can then be used with the socket or tool. After use, the socket or tool may be removed from the fitting 52 and the handle replaced in the receiver assembly 54. In certain embodiments, an optional lug socket configured for engaging the lug nuts of the particular truck for which the handle assembly 10 is employed may be provided.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A truck bed handle assembly comprising:
 a handle formed from an elongated handle body having an upper end and lower end, the handle body being formed into upper and lower sections that are pivotably coupled to one another; and
 a handle receiver assembly that is configured for mounting to a sidewall of a truck bed, the handle receiver assembly having a handle receiving portion that engages the lower end of the elongate handle body to hold the handle body in a generally upright orientation, the handle receiving portion of the handle receiver assembly receiving the lower section and a portion of the upper section of the handle body so that both upper and lower sections are held in a generally upright orientation in a first mode and wherein the handle receiving portion receives only the lower section in a second mode so that the upper section is pivotal to a second non-upright orientation.

2. The truck bed handle assembly of claim 1, wherein: the handle receiving portion releasably engages the handle body.

3. The truck bed handle assembly of claim 1, wherein: the handle is collapsible.

4. The truck bed handle assembly of claim 1, wherein: the handle is non-collapsible.

5. The truck bed handle assembly of claim 1, wherein: the handle receiving portion comprises a tubular member having a central opening and the lower end of the handle body is configured as a tubular member that is closely received within the central opening of the tubular member.

6. The truck bed handle assembly of claim 5, wherein: the handle receiver assembly includes a receiver bracket that supports the tubular member.

7. The truck bed handle assembly of claim 1, wherein: the handle includes a tool fitting on one end for receiving a tool component so that the handle may be used as a handle for the tool component.

8. The truck bed handle assembly of claim 1, wherein: the handle receiver assembly further comprises a handle rest for engaging the upper section of the handle body when the upper section is pivoted to the second non-upright orientation in the second mode.

9. The truck bed handle assembly of claim 1, wherein: the handle is provided with a hand grip at the upper end of the handle body.

10. The truck bed handle assembly of claim 1, wherein: handle is provided with a threaded coupling member for coupling threaded attachments to the handle.

11. A truck bed handle assembly comprising:
a handle formed from an elongated handle body having an upper end and lower end, the handle body being formed into upper and lower sections that are pivotably coupled to one another; and
a handle receiver assembly comprising a receiver casing having mounting flanges for mounting to a sidewall of a truck bed, the receiver casing housing a tubular member having a central opening that receives the lower end of the elongate handle body to releasably couple the handle body to the handle receiver assembly and wherein the tubular member facilitates holding the handle body in a generally upright orientation, the tubular member having a stop member located at the lower end of the tubular member that engages the lower end of the handle body when the handle body is fully received within the tubular member, the tubular member of the handle receiver assembly receiving the lower section and a portion of the upper section of the handle body so that both upper and lower sections are held in a generally upright orientation in a first mode and wherein the tubular member receives only the lower section in a second mode so that the upper section is pivotal to a second non-upright orientation.

12. The truck bed handle assembly of claim 11, wherein: the handle includes a tool fitting on one end for receiving a tool component so that the handle may be used as a handle for the tool component.

13. The truck bed handle assembly of claim 11, wherein: the handle receiver assembly further comprises a handle rest for engaging the upper section of the handle body when the upper section is pivoted to the second non-upright orientation in the second mode.

14. The truck bed handle assembly of claim 11, wherein: the handle is provided with a hand grip at the upper end of the handle body.

15. The truck bed handle assembly of claim 11, wherein: the handle is provided with a threaded coupling member for coupling threaded attachments to the handle.

16. A method comprising:
providing a handle assembly mounted on a truck bed, the handle assembly comprising 1) a handle formed from an elongated handle body having an upper end and lower end, the handle body being formed into upper and lower sections that are pivotably coupled to one another, and 2) a handle receiver assembly that is configured for mounting to a sidewall of the truck bed, the handle receiver assembly having a handle receiving portion that engages the lower end of the elongate handle body to hold the handle body in a generally upright orientation, the handle receiving portion of the handle receiver assembly receiving the lower section and a portion of the upper section of the handle body so that both upper and lower sections are held in a generally upright orientation in a first mode and wherein the handle receiving portion receives only the lower section in a second mode so that the upper section is pivotal to a second non-upright orientation; and
grasping a handle of the handle assembly while at least one of being positioned on a truck bed, entering a truck bed or exiting a truck bed.

\* \* \* \* \*